Patented Dec. 2, 1941

2,264,904

UNITED STATES PATENT OFFICE 2,264,904

PROCESS OF REFINING HYDROCARBON OILS

Norman E. Lemmon, Hammond, Ind., and David W. Bransky, Chicago, Ill., assignors to Standard Oil Company, Chicago, Ill., a corporation of Indiana No Drawing. Application April 17, 1939, Serial No. 268,338

7 Claims. (Cl. 196—40)

This invention relates to improvements in the manufacture of mineral oils and particularly relates to improvements in the removal of black sludge acids from white mineral oils which have been treated with fuming sulfuric acid.

It is an object of the present invention to provide a method of treating petroleum distillates, particularly viscous petroleum distillates which facilitates substantially complete elimination of the black sludge acids remaining in the oil after the usual sulfuric acid treatment. Another object of the invention is to provide a method of removing suspended black sludge acids from the sulfuric acid treated viscous petroleum distillates which eliminates the necessity of long time settling and/or centrifugal separation. Still another object of the invention is to provide a rapid and efficient method of removing black sludge acids from sulfuric acid treated white oils whereby increased yields of white oil and oil-soluble sulfonic acid soaps of improved quality are obtained. Other objects and advantages of the invention will become apparent as the description thereof proceeds.

In the manufacture of white oils, the process almost universally employed is the treatment of a petroleum distillate of the desired specifications with large quantities of sulfuric acid. In general, fuming sulfuric acid of about 104½% sulfuric acid strength is employed, and the acid usually applied to the oil in small portions or "dumps." For example, the distillate may be treated with a total of eight (8) pounds of acid per gallon of oil, the acid being added in ½ pound "dumps" and the sludge formed during each dump being removed either by gravity settling or by centrifugal separation before the succeeding acid dump is applied. After the removal of the bulk of the sludge from the last acid dump there remain in the oil, dispersed therein in a finely divided state, black sludge acids. It is the usual practice to permit the acid-treated oil to remain in a quiescent state for about 5 to 7 days, and in some cases as long as 20 days, in order to permit the black sludge acids to settle out of the oil. Even after prolonged settling, there still remains dispersed in the oil a substantial amount of black sludge acid which adversely affects the quality of the finished oil, decreases the yield of the finished oil and also results in the poorer quality mahogany soap.

We have discovered that traces of black sludge acids remaining tenaciously dispersed in the oil after the usual sulfuric acid treatment followed by the removal of the acid sludge by settling and/or centrifugal separation can be substantially completely removed by washing the acid treated oil with sulfuric acid of from about 92% to about 100% strength at a temperature of from about 70° F. to about 150° F., and preferably with sulfuric acid of about 95% strength and at a temperature within the range from about 80° F. to about 120° F. In the washing step we may employ from about ½ pound to about 5 pounds of the acid per gallon of oil although we prefer to use from about ½ to about 2 pounds of acid per gallon of oil.

The wash acid containing black sludge acids may be recycled for washing subsequent batches of sour oils containing finely dispersed black sludge acids or it may be used as the first acid "dump" on untreated white oil distillates or other mineral oil distillates.

We are aware that in the prior art, petroleum distillates have been treated with sulfuric acid of about 90 to 100% strength and also that petroleum distillates have been treated successively with acids of decreasing strength. However, in each of the prior art processes upon the application of the acid to the oil being treated there is an actual chemical reaction between the acid and the constituents of the oil resulting in the formation of a sludge. Our process is to be distinguished from the prior art processes in that our invention involves a mere washing of the acid-treated oil with 92% to 100% sulfuric acid and does not involve any chemical reaction as evidenced by the absence of any sludge formation. Chemical reaction with the weak acid does not take place in the range 70° F. to 150° F. in view of the drastic prior treatment with strong fuming acid.

Our invention is also applicable to the removal of black sludge acids from oils treated with sulfuric acid anhydride ($SO_3$) either in the vapor or liquid phase. As in the treatment of mineral oils with fuming sulfuric acid, oils treated with sulfuric acid anhydride contain black sludge acids which are difficult to remove. However, we have discovered that oils so treated can be made substantially freed of these black sludge acids by washing with about 92% to 100% sulfuric acid at a temperature of about 70° F. to about 150° F. prior to neutralization.

Our invention is exemplified by the following experiments which are given by way of illustration and not intended to be a limitation of our invention. A white oil distillate, specifically a distillate from Kittrell crude, was treated with a total of 8 pounds of 104½% sulfuric acid per gallon of oil and after the sludge from the last acid dump was drawn off, the acid-treated oil was settled for six days. At the end of this period the total acidity of the oil was equivalent to 16 milligrams of NaOH per gram of oil. After 18 days of gravity settling the total acidity was reduced to the equivalent of 4.7 milligrams of NaOH per gram of oil.

The six day settled sour oil having an acidity equivalent to 16 milligrams of NaOH per gram of oil was washed with 60% alcohol, neutralized, and the neutralized oil was given four alcohol washes. The Saybolt viscosity at 100° F. and the U. S. P. acid test after each alcohol wash of the neutralized oil were as follows:

|  | Saybolt viscosity at 100° F. | U. S. P. acid test |
|---|---|---|
|  | Seconds | N. P. A. |
| After 1st wash | 556 | 7 -8 |
| After 2nd wash | 353 | 5 |
| After 3rd wash | 347 | 4½-5 |
| After 4th wash | 336 | 3½ |

A portion of the six day settled sour oil was washed with ½ pound of 95% sulfuric acid per gallon of oil at a temperature of about 90° F. and the acid-washed oil settled for 24 hours to permit the black sludge acids to settle. After the settled black sludge acids had been removed, the total acidity of the acid-washed sour oil was reduced to the equivalent of 3.2 milligrams of NaOH per gram of oil. It will be observed that the total acidity of the acid-washed 6 day settled sour oil was better than that of the sour oil after being settled for 18 days.

The acid-washed six day settled sour oil was washed with alcohol, neutralized and then given 3 alcohol washes. The Saybolt viscosity at 100° F. and the U. S. P. acid test after each alcohol wash are given below:

|  | Saybolt viscosity at 100° F. | U. S. P. acid test |
|---|---|---|
|  | Seconds | N. P. A. |
| After 1st alcohol wash | 343 | 3½-4 |
| After 2nd alcohol wash | 343 | 3 -3½ |
| After 3rd alcohol wash | 336 | 1 -1½ |

The acid-washed oil after the first alcohol wash was better than the six day settled sour oil, which had not been acid washed, after four alcohol washes, and the acid-washed oil after the third alcohol wash was water-white and better than the U. S. Pharmocopeia acid test specification for a percolated oil. The acid-washed sour oil gives greater percolation yields and a better grade of mahogany soap than the sour oil which is not acid washed but settled for prolonged periods.

While in the foregoing illustration of our invention we have employed a sour oil which had been settled for six days, it is not necessary that the acid-treated oil be settled for such a period in order to obtain the observed improvements with the acid-washed oil. The acid wash may be applied to the acid-treated oil immediately after the sludge is removed after the last acid dump, although it is preferable to permit the sludge from the last acid treatment to settle for at least 24 hours.

We have described the treatment of white oil distillates with successive "dumps" of fuming sulfuric acid. As an alternative method we may pre-treat the white oil distillate with 93% sulfuric acid, or, as aforementioned, with the wash acid containing black sludge acids, remove the sludge so formed and subsequently treat with successive portions of fuming sulfuric acid.

The total acidity as reported herein is the acidity due to the black sludge acids, sulfur dioxide and sulfuric acid.

The U. S. P. acid test as used herein refers to the U. S. Pharmacopeia acid test which consists of heating 5 cc. of a refined white oil and 5 cc. of chemically pure 94.5 to 95.5% sulfuric acid in a glass stoppered cylinder for ten minutes in a bath of boiling water and shaking the cylinder at 30 second intervals. The oil must remain colorless and the acid must not become darker than pale amber or about 3 N. P. A. color.

While we have described our invention by reference to specific examples thereof, we do not wish to be limited thereto, but claim as new, and desire to be secured by Letters Patent the invention defined by the appended claims.

We claim:

1. In the process of preparing a white mineral oil in which a mineral oil distillate is treated with a plurality of portions of fuming sulfuric acid and the sludge formed removed prior to the addition of each subsequent portion of acid, the improvement for removing substantially all of the black sludge acids from the acid-treated oil which comprises consecutively removing the sludge from the oil after the addition of the last portion of sulfuric acid, washing the sour oil, prior to the neutralization of said fuming sulfuric acid-treated mineral oil distillate, with sulfuric acid of about 92% to about 100% strength at a temperature of about 70° F. to about 150° F., settling the washed sour oil for at least 24 hours, removing the wash acid containing black sludge acids from the washed sour oil and subsequently alcohol washing and neutralizing the fuming sulfuric acid-treated sour oil.

2. In the process described in claim 1 in which the first portion of acid used in treating the mineral oil distillate is the wash acid containing black sludge acid from a previous treatment of an acid-treated distillate.

3. In the process of preparing a mineral medicinal oil in which the mineral oil distillate is treated with about 5 pounds to about 8 pounds of fuming sulfuric acid per gallon of oil, the improvement comprising consecutively removing the sludge formed after the addition of the fuming sulfuric acid, washing the sour oil prior to neutralization with ½ pound to about 5 pounds of 92% to 100% sulfuric acid per gallon of oil at a temperature of about 70° F. to about 150° F., settling the washed sour oil for at least 24 hours in order to separate the oil from the wash acid, removing the wash acid containing black sludge acids from the washed sour oil, alcohol washing and neutralizing the black sludge acid-free sour oil and subsequently percolating the neutralized oil to the desired color.

4. In the process of preparing a mineral medicinal oil in which the mineral oil distillate is treated with about 5 pounds to about 8 pounds of fuming sulfuric acid in about ½ pound portions, the improvement for removing substantially all of the black sludge acids from the acid-treated oil, which comprises consecutively removing the sludge from the oil after the last portion of the fuming sulfuric acid has been added, washing the sour oil, prior to caustic neutralization, with about ½ pound to about 2 pounds of 95% sulfuric acid at a temperature of about 80° F. to about 120° F., settling the acid-washed sour oil for at least 24 hours to separate the wash acid containing the black sludge acids from the sour oil, removing the wash acid containing dissolved black sludge acids from the washed sour oil and subsequently alcohol washing and caustic neutralizing the sour oil.

5. In the treatment of a hydrocarbon oil with acidic materials selected from the group consisting of fuming sulfuric acid and sulfuric acid anhydride wherein black sludge acids are retained in the treated oil after removal of the acid sludge, the improvement comprising consecutively removing the acid sludge and washing the treated hydrocarbon oil with sulfuric acid of about 92% to about 100% strength at a temperature of about 70° F. to about 150° F., whereby said black sludge acids are substantially completely removed from the treated hydrocarbon oil.

6. In the treatment of a hydrocarbon oil with fuming sulfuric acid wherein black sludge acids are retained in the fuming sulfuric acid treated oil after removal of the acid sludge, the improvement comprising consecutively removing the acid sludge and washing the fuming sulfuric acid treated hydrocarbon oil with sulfuric acid of about 92% to about 100% strength at a temperature of about 70° F. to about 150° F.

7. In the treatment of a hydrocarbon oil with sulfuric acid wherein black sludge acids are retained in the fuming sulfuric acid treated oil after removal of the acid sludge, the improvement comprising consecutively removing the acid sludge and washing the fuming sulfuric acid treated hydrocarbon oil with about one-half pound to about five pounds of about 92% to about 100% sulfuric acid per gallon of oil at a temperature of about 70° F. to about 150° F., whereby the black sludge acids are substantially completely removed from the fuming sulfuric acid treated hydrocarbon.

NORMAN E. LEMMON.
DAVID W. BRANSKY.